United States Patent
Papineau et al.

(12)

(10) Patent No.: US 10,354,458 B1
(45) Date of Patent: Jul. 16, 2019

(54) VEHICLE OCCUPANCY VERIFICATION UTILIZING PROXIMITY CONFIRMATION

(71) Applicants: Michael Papineau, East Toronto (CA); Mark Feltham, East Toronto (CA)

(72) Inventors: Michael Papineau, East Toronto (CA); Mark Feltham, East Toronto (CA)

(*) Notice: Subject to any disclaimer, the term of this patent is extended or adjusted under 35 U.S.C. 154(b) by 0 days.

(21) Appl. No.: 15/789,503

(22) Filed: Oct. 20, 2017

(51) Int. Cl.
| H04W 24/00 | (2009.01) |
| G07B 15/06 | (2011.01) |
| G08G 1/017 | (2006.01) |
| G06K 9/00 | (2006.01) |
| H04L 29/08 | (2006.01) |
| H04W 4/02 | (2018.01) |

(52) U.S. Cl.
CPC ....... *G07B 15/063* (2013.01); *G06K 9/00838* (2013.01); *G08G 1/017* (2013.01); *H04L 67/18* (2013.01); *H04L 67/26* (2013.01); *H04W 4/023* (2013.01)

(58) Field of Classification Search
CPC .................................................... G07B 15/063
See application file for complete search history.

(56) References Cited

U.S. PATENT DOCUMENTS

| 2006/0122925 A1* | 6/2006 | Wesby ................. G06Q 40/00 705/35 |
| 2011/0137773 A1* | 6/2011 | Davis, III .......... G01G 19/4142 705/34 |
| 2014/0180773 A1* | 6/2014 | Zafiroglu ........... G06Q 30/0207 705/13 |
| 2016/0219398 A1* | 7/2016 | Kamensky ............. H04W 4/02 |

* cited by examiner

*Primary Examiner* — Justin Y Lee
(74) *Attorney, Agent, or Firm* — John L. Sotomayor

(57) ABSTRACT

The present invention is a method and system to verify carpool occupancy compliance for access to High Occupancy Vehicle (HOV) lanes, High Occupancy or Toll (HOT) lanes, or other vehicle-occupancy contingent rewards. The present invention uses software and hardware devices with radio-frequency transmitter modules to permit "matchmaking" between suitable drivers and riders while using GPS coordinates to confirm passenger proximity to a driver. This driver-rider co-location is performed via push notification and server analysis of driver and rider GPS data. Alternatively, co-location is performed using a combination of GPS data analysis and photographic analysis. Occupancy compliance rewards can be communicated directly to an appropriate regulatory body.

12 Claims, 4 Drawing Sheets

VEHICLE OCCUPANCY VERIFICATION UTILIZING PROXIMITY CONFIRMATION

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

More and more Department of Transportation (DOT) jurisdictions seek to create incentives for carpooling such as access to High Occupancy Vehicle (HOV) lanes on public highways. Such HOV lanes permit use only when a vehicle is being used to transport multiple occupants. One of the challenges with dedicating a lane to such "carpooling", particularly in the introductory phase when there are not many carpoolers, is the resulting, and politically unpopular, increased congestion in the remaining, regular lanes.

To help mitigate this issue, many jurisdictions are introducing HOV lanes as High occupancy OR Toll (HOT) lanes to provide paid access to the lanes for single-occupant vehicles. While paid access to HOT lanes can be less democratic than access to lanes based solely upon occupancy, use of HOT lanes can be more politically acceptable. This is because overall traffic congestion resolution theoretically becomes self-regulating: some drivers will opt to pay a toll to access a reserved lane when congestion is high.

An additional carpooling incentive can take the form of access to private toll roads, with such access also being based upon paid admission. While carpooling can erode the profitability of toll highways, the availability of carpooling on private toll roads can help to alleviate overall traffic volume while simultaneously leading to lower road maintenance and lane expansion costs.

One of the biggest challenges in a municipality's introduction of a carpool lane is its being able to enforce a carpool occupancy requirement and, in the case of HOT lane access, knowing the identity of the party to be billed for single occupancy access. While technology exists to use photo confirmation to determine occupancy, these technologies often produce questionable confirmations that subsequently require human operator intervention post lane-access. Periodically, such technologies lead to incorrect billing, resulting in a costly and time-consuming review process.

Alternatively, drivers may employ transponder-based systems that require driver input prior to beginning a shared ride. Before approaching a verification point, a driver using a transponder system must remember to indicate carpool activity, usually by activating a switch on his transponder. In some cases the driver is required to switch off the transponder to force a "photo exception" to the existing transponder system. This reliance on driver input can lead to system failure in cases where a driver fails to timely or properly indicate carpool activity.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
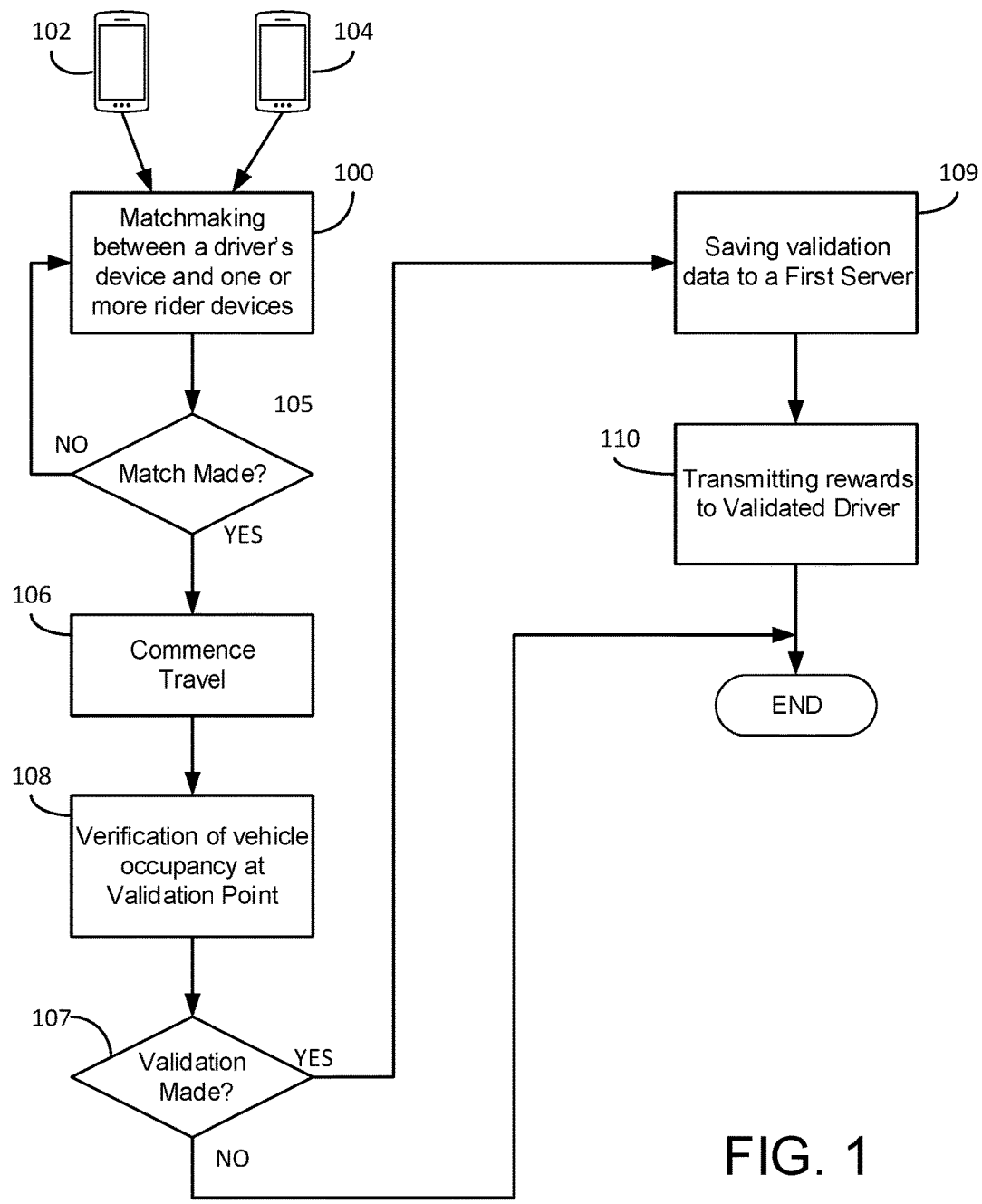
FIG. 1 is a system diagram for an exemplary system operation consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

References herein to "device" indicate electronic devices that include but are not limited to, a radio frequency (RF) transmitter, a mobile phone, a laptop, an electronic tablet, or any personal digital assistance device.

References to "verification" indicate an objective process for confirming user input to a device.

References to "validation point" indicate any physical location where a request for verification could logically be made.

References to "rewards" indicate special privileges or access to special privileges that result from successful verification of user input.

References to "photo" indicate a digital visual representation of a vehicle's passenger area.

References to "GPS" indicate reference to the Global Positioning System (GPS) space-based radio-navigation satellite array and associated technologies.

References to "riders" or "multiple riders" in a vehicle refers to 2, 3, or more riders depending upon the capacity of the vehicle.

Urban and suburban dwellers often seek shared transportation options for reasons as diverse as economy in travel expenses, shared responsibility in vehicle operation, and human companionship during a commute. In metropolitan areas where traffic congestion is rife, local authorities often incentivize shared transportation options in order to relieve traffic congestion and reduce expensive road maintenance. Setting aside special travel lanes for multi-occupant "carpooling" vehicles is one such incentive that municipalities employ. Vehicles with certain established occupancies are permitted unfettered access to lesser-travelled High Occupancy Vehicle (HOV) or High Occupancy/Toll (HOT) lanes, theoretically minimizing travel delays due to traffic congestion. Such delay minimization is a coveted reward for those who choose to carpool.

Because of the desirability of designated HOV and HOT lane access, municipalities must adopt systems and procedures to track, prevent and manage abuse of such lane access. Existing systems of ensuring compliance with rules regarding High Occupancy lane access rely on self-reporting, photographic verification, or post-billing adjudication.

Drivers and riders who wish to carpool may not know of each other or may not share compatible commuting schedules. For instance, even if two commuters are aware of each other, a vehicle driven by Driver A and bound for mid-town at 6:00 am may not prove a suitable match for Rider B needing to arrive in mid-town at 6:00 pm. Consequently, a need exists for a system and method for verifying carpool compliance using software and hardware devices that permit "matchmaking" between suitable drivers and riders while confirming passenger proximity to a driver.

In an embodiment, the invention described herein is a mobile-device application that uses user interfaces and GPS software to provide a list of prospective drivers with known travel itineraries to any number of potential riders. Riders can flag drivers based upon criteria such as exactness of itinerary match and prior rider reviews of drivers. Drivers can accept or reject specific riders as matches.

In an embodiment, while transponders identify the vehicle, the RideFlag® system identifies vehicle occupancy and location. In an embodiment, the RideFlag® system confirms the presence of two or more occupants within a single vehicle when drivers and riders use the application on HOT lanes, even for free rides with no other incentive than access to the HOV/HOT lane toll free. The RideFlag® system provides the platform to collaborate with jurisdictions and Toll Highway operators to confirm occupancy.

In an exemplary embodiment, riders and drivers may use the RideFlag® application to establish carpools on an as-needed basis with no carpool registration required. The RideFlag® system is totally dynamic in that carpools are created and identified at the singular transaction level. In a non-limiting example, a carpool can exist for a single instance of a paired ride, as well as for other groups of riders and lengths of rides. The identification of the carpool is automatically known by the RideFlag® system. In this exemplary embodiment, the platform identifies the occupants, the route and time of access. The RideFlag® server may then publish this confirmation to each of the relevant highway operators immediately post the access, complementing the existing photo confirmation systems and eliminating the need for human confirmation for RideFlag® application users.

Once drivers and riders have accepted matches, each is notified of the location of the other through use of GPS data associated with the driver's and rider's mobile devices. Once drivers and riders are physically within one vehicle, the GPS data can be analyzed to verify co-location of the driver and rider(s).

In an embodiment, this co-location verification takes place at a temporal validation point, at which time the rider receives a push notification to share the GPS data on his device, giving evidence as to the physical location of the device. The driver's GPS coordinates are known to the application (app), since the driver keeps his app open for the duration of a trip. A first server compares the GPS data from both devices and if resulting comparison evidences co-location of devices, the co-location is considered to be verified. Confirmation of such verified co-location can then be submitted to appropriate regulatory bodies for the doling of a reward, such as permitted HOV or HOT access, or permitted preferred parking, or other rewards that may be provided by the transportation authority or additional entities partnering with the transportation authority. The system in in its entirety is referred to as the RideFlag® application.

In an embodiment, the invention described herein is a method of verifying commuter vehicle occupancy by establishing communication between a server and one or more mobile devices, determining the physical locations of each of said mobile devices, verifying said mobile devices are co-located, determining whether said proximity conforms to one or more pre-determined values, delivering communications from the server to a secondary server (like one operated by or on behalf of a regulatory body), and delivering communications from the server to said mobile devices. Verification of vehicle occupancy may be affected through analysis of one or more photographic representations of the vehicle passenger compartment.

In an alternate embodiment of the invention, a system of verifying commuter vehicle occupancy is described. The system may include a user interface, a server having a processor in wireless communication with one or more mobile devices, and a software module operative to determine the physical locations of the mobile devices. In use, the server verifies co-location of the mobile devices, delivers communications from the server to a secondary server (like one operated by or on behalf of a regulatory body), and delivers communications from the server to a user interface display on any one of the mobile devices.

The system and method described herein identifies vehicle occupancy and location as a natural product of the RideFlag® transportation application. The application confirms the presence of two or more occupants when drivers and riders simply use the app to match prospective drivers with prospective riders. When used with respect to HOT or HOV lane access, RideFlag® provides the platform to collaborate with jurisdictions and Toll Highway operators to confirm vehicle occupancy.

In an alternative embodiment, the RideFlag® application may permit the use of free or discounted access to HOT lanes to vehicles in which there is only one verified person based upon special considerations. Such special considerations may include, but are not limited to, premium access based upon a specified number of paid uses of the HOT lane, special discounts for particular dates or times, a reward offered by the operator of the HOT lane, or any other special consideration defined by the authority operating the HOT lane. In a non-limiting example, a vehicle with a single driver may be permitted to use the HOT lane after accumulating 10 authorized uses of the HOT lane, meeting all conditions of such use. Additionally, an authority operating a HOT lane may permit use of the HOT lane to single driver vehicles, or vehicles that do not meet all of the conditions for use of a particular HOT lane, to users with a mobile device in the vehicle that has been certified as having a special premium established by the authority operating the HOT lane even though the user of the mobile device in the vehicle may not be the driver of the vehicle.

Turning now to FIG. 1, a system diagram for an exemplary system operation consistent with certain embodiments of the present invention is shown. During matchmaking 100, driver's device 102 and rider's device 104 are paired based upon data provided by the users of the devices, such as destination, desired times of departure and arrival, and fee amounts. Once paired 105, driver's device 102 and rider's device 104 enter commence travel phase 106. Commence Travel phase 106 includes driver and rider meeting in physical space and beginning travel to a mutually-agreed upon destination. Upon reaching discrete validation points 108, driver's device 102 and rider's device 104 are triggered by a first server 109 to provide first server 109 with GPS coordinates to determine whether devices are co-located. If the devices associated with the driver and one or more riders are determined to be co-located at 107, and if first server 109 determines that reward requirements are met, first server 109 confirms reward status with second server (owned or controlled by the reward grantor, such as a regulatory agency, transportation authority, or a partner to these entities) and with at least driver's device 102. Upon confirmation of the reward status, rewards may be transmitted to a driver 110.

Figure 2:
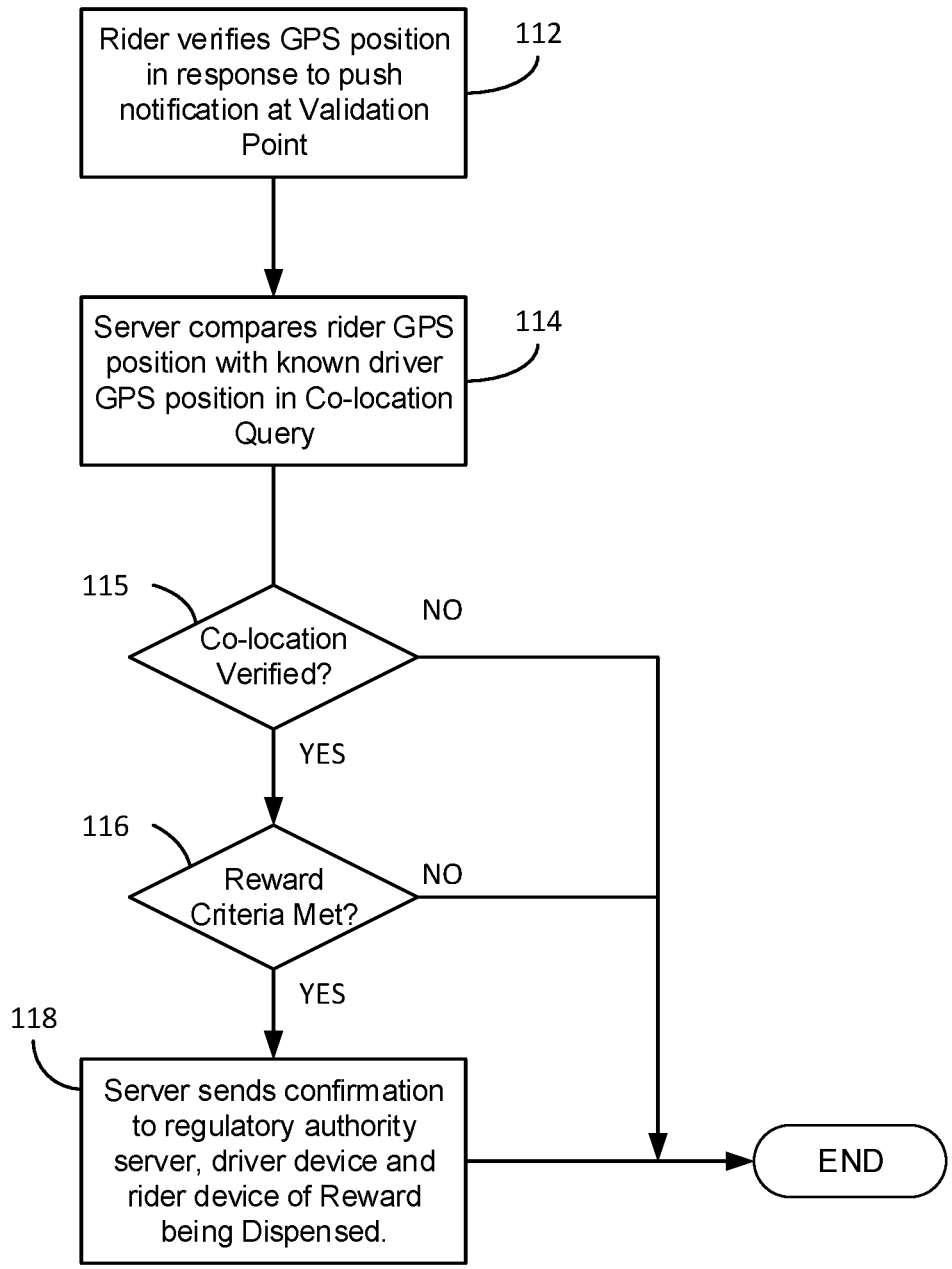
FIG. 2 is a process flow diagram for the determination of sufficiency of award criteria using mobile device GPS data and communication of same by server operation consistent with certain embodiments of the present invention.

Turning now to FIG. 2, a process flow for the determination of award criteria consistent with certain embodiments of the present invention is shown. In an embodiment, a rider verifies his GPS coordinates at a validation point 112. At 114, the system server compares rider's GPS coordinates to driver's known GPS coordinates. From this information, the server may determine if the driver and rider(s) are currently co-located 115. At 116, the server determines if the necessary reward criteria have been met. Most commonly, reward criteria would involve the number of occupants in a car associated with a time of day. The number of occupants in a car may be determined by the number of RF signals detected at a validation point, or by photo evidence provided by any one of the detected mobile devices associated with an RF signal that is collocated with the driver's mobile device. At 118, the server sends determination regarding satisfaction of reward criteria to the appropriate regulatory authority, transportation authority or partner, the rider(s), and the driver.

Figure 3:
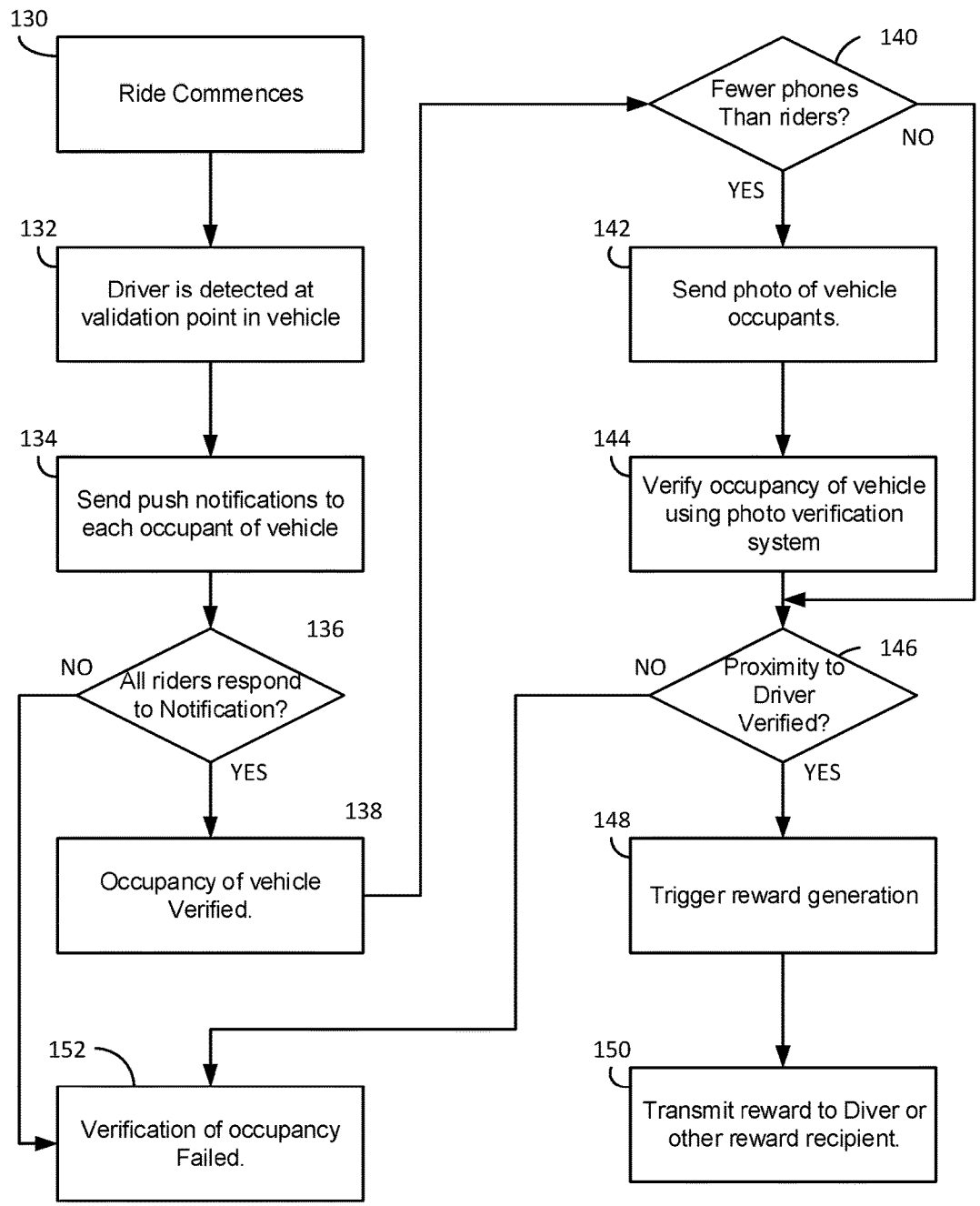
FIG. 3 is a process flow diagram for verification of vehicle occupancy consistent with certain embodiments of the present invention.

Turning now to FIG. 3, a process flow diagram for verification of vehicle occupancy is shown. In an embodiment, at 130, the ride commences, with the driver and rider beginning the trip to any reward point or rider destination. At 132, the driver's device comes within detection distance of a validation point which may then trigger a server request for verification of the number of car occupants. In a non-limiting example, such a validation point would typically be positioned immediately prior to HOV or HOT lane access. In the case where the reward is a preferred parking spot instead of special lane access, the validation point may be positioned at a parking lot entrance or parking garage entrance.

In an embodiment, at 134, in cases where the number of RF transmitter-equipped devices (i.e.: smartphones, or other RF transmitting devices) equals the number of individuals collocated in a vehicle, which includes the driver and all riders, the first server sends a push notification to each individual to respond with GPS coordinates of the location of each RF transmitter-equipped device. This response from each individual permits the RideFlag® server to determine their proximity to the driver of the vehicle. At 136, if all respondents are determined to be within a set distance that indicates they are close enough to the driver that they are within the driver's vehicle, the RideFlag® system may verify that the occupancy requirements have been met for the driver's vehicle 138. These responses provide for the verification of the number of riders within the vehicle and provide a verification step for occupancy in the vehicle.

In an embodiment, at 140, in cases where the number of RF transmitter-equipped devices is smaller than the number of riders, a different method of verification may be required. In this exemplary embodiment, one of the riders (passengers) may be instructed to send a photo of vehicle occupants time-stamped with the time of the driver's device that triggered the verification request at the encountered validation point 142. Uploading the time-stamped photo to the server permits the photo verification of the number of occupants in a vehicle utilizing existing photo verification systems 144. The server may utilize the photo verification of the occupants of the vehicle to provide the occupancy verification step for the vehicle.

In this exemplary embodiment, at 146, if the first server determines that the driver and the riders have met occupancy requirements by verifying the proximity of each occupant to the driver of the vehicle, a reward may be triggered 148. If the first server determines that the driver and riders have failed proximity requirements, a failure notice is triggered. If the reward grantor suspects that the driver has falsified the proximity requirements the server may label this action as "cheating" the system. In a non-limiting example, and not by way of limitation, one condition the server may label as "cheating" may be using multiple phones not associated to physical individuals to attempt to establish that there are an equal number of RF-transmitting devices and individuals collocated within a single vehicle. If the server determines that an action or activity that may be labeled as "Cheating" has occurred, the server may require the performance of a dual validation activity, such as requiring both GPS push notification responses and photo identification. At 146, the server performs dual validation with post-event reply requests during a time interval when it would be unlikely or illogical for two or more devices associated with separate, physical individuals to be co-located.

At 150, if the reward grantor is satisfied that that the occupancy of the vehicle has been properly verified, and that the driver is not "cheating" in some fashion, the reward grantor may then transmit the reward certificate, notification, validation, or permission to the driver of the vehicle.

Figure 4:
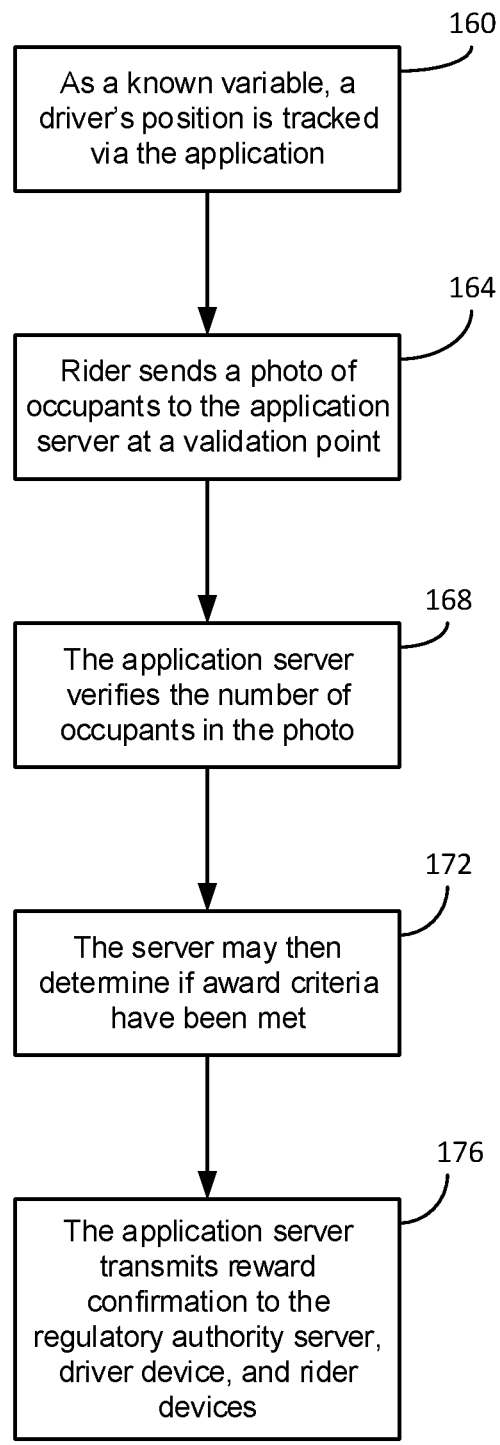
FIG. 4 is a process flow diagram for the determination of sufficiency of award criteria using one or more mobile device digital images and communication of the same by server operation consistent with certain embodiments of the present invention.

Turning now to FIG. 4, a process flow for an alternate determination of award criteria consistent with certain embodiments of the present invention is shown. In an embodiment, a device having an RF transmitter and associated with a driver communicates its physical location to an application server at 160. At 164, a rider sends a verification photo of all vehicle occupants to the application server from the GPS coordinates corresponding to a validation point. At 168, the application server determines the number of occupants that are present in the vehicle in the verification photo. At 172 the application server determines if the number of occupants satisfies the reward criteria. At 176 the application server sends a determination regarding satisfaction of reward criteria to the appropriate regulatory authority, transportation authority or other authorized entity, the rider, and the driver. The regulatory authority, transportation authority, or other authorized entity may then issue a certificate or any other verification acknowledgement instituted for use by the issuing authority that the reward will be provided to a person associated with the vehicle, where the person associated with the vehicle may include a driver, a rider, or other authorized person such as, in a non-limited example, the owner of the vehicle.

While certain illustrative embodiments have been described, it is evident that many alternatives, modifications, permutations and variations will become apparent to those skilled in the art in light of the foregoing description.

We claim:

1. A method of verifying commuter vehicle occupancy, comprising:
    establishing communication between a server and one or more mobile devices;
    determining the physical locations of each of said mobile devices;
    determining that said mobile devices are co-located within a vehicle;
    verifying said co-location of said mobile devices by detecting a number of Radio Frequency (RF) signals from said one or more mobile devices at a validation point, and verifying that the number of RF signals detected equals a number of said one or more mobile devices within said vehicle;
    determining whether said co-location produces a proximity value that conforms to one or more pre-determined values;
    a passenger located within said commuter vehicle collecting a digital photograph of all occupants in said commuter vehicle at said validation point;
    transmitting said digital photograph to said server to verify that a number of occupants in said commuter vehicle is equal to or greater than the number of RF signals detected within said commuter vehicle;
    delivering communications from the server to a secondary server; and
    delivering communications in the form of a push notification from the server to individuals associated with said mobile devices and requiring a response from each of said individuals receiving said push notification.

2. The method of claim 1, where the proximity conforms to the value of being within a pre-determined distance of the driver of a motor vehicle.

3. The method of claim 1, where the determination of said proximity of said physical locations is made in part through identification GPS coordinates for the physical location of said one or more mobile devices as being within a pre-set physical boundary that corresponds to a motor vehicle.

4. The method of claim 1 where the determination of said proximity of said physical locations is made in part through analysis of a time-stamped photographic image.

5. The method of claim 1 where communication to said secondary server serves as communication with a vehicle regulatory body such as a department of motor vehicles, department of transportation, or other identified authority.

6. The method of claim 1 where the mobile devices include any device equipped with a radio frequency (RF) transmitter capability.

7. A system of verifying commuter vehicle occupancy, comprising:
    a server having a processor in wireless communication with one or more mobile devices;
    a user interface;
    a locator process residing in said server and operative to determine the physical locations of said mobile devices;
    the server operative to determine that said mobile devices are co-located within a vehicle;
    said server verifying said co-location of said mobile devices by detecting a number of Radio Frequency (RF) signals from said one or more mobile devices at a validation point, and verifying that the number of RF signals detected equals a number of said one or more mobile devices within said vehicle;
    delivering communications from the server to a secondary server;
    a passenger located within said commuter vehicle collecting a digital photograph of all occupants in said commuter vehicle at said validation point;
    transmitting said digital photograph to said server to verify that a number of occupants in said commuter vehicle is equal to or greater than the number of RF signals detected within said commuter vehicle; and
    delivering communications in the form of a push notification from the server to individuals associated with said mobile devices and requiring a response from each of said individuals receiving said push notifications.

8. The system of claim 7, where proximity conforms to the value of being within a pre-determined distance of the driver of a motor vehicle.

9. The system of claim 7, where the determination of said proximity of said physical locations is made in part through identification GPS coordinates for the physical location of said one or more mobile devices as being within a pre-set physical boundary that corresponds to a motor vehicle.

10. The system of claim 7, further comprising
    a camera operative to deliver one or more time-stamped digital communications from one or more of said mobile devices to said server; and
    the server further determining the vehicle occupancy by analyzing said digital communications.

11. The system of claim 7, where communication to said secondary server serves as communication with a vehicle regulatory body such as a department of motor vehicles, department of transportation, or other identified authority.

12. The system of claim 7 where the mobile devices include any device equipped with a radio frequency (RF) transmitter capability.

* * * * *

UNITED STATES PATENT AND TRADEMARK OFFICE
CERTIFICATE OF CORRECTION

| | |
|---|---|
| PATENT NO. | : 10,354,458 B1 |
| APPLICATION NO. | : 15/789503 |
| DATED | : July 16, 2019 |
| INVENTOR(S) | : Michel Papineau et al. |

It is certified that error appears in the above-identified patent and that said Letters Patent is hereby corrected as shown below:

On the Title Page

Item (72) the first inventor's name "MICHAEL PAPINEAU" should be -- MICHEL PAPINEAU --.

Signed and Sealed this
Eleventh Day of July, 2023

Katherine Kelly Vidal
*Director of the United States Patent and Trademark Office*